(12) United States Patent
Horibe et al.

(10) Patent No.: US 7,548,674 B1
(45) Date of Patent: Jun. 16, 2009

(54) ALIGNMENT METHOD FOR CIRCULAR MULTI-CORE OPTICAL FIBER

(75) Inventors: Akihiro Horibe, Aoba-ku (JP); Fumiaki Yamada, Tsuzuki-ku (JP); Yoichi Taira, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/263,846

(22) Filed: Nov. 3, 2008

(51) Int. Cl.
*G02B 6/26* (2006.01)
*G02B 6/42* (2006.01)
*G02B 6/04* (2006.01)

(52) U.S. Cl. .................. 385/52; 385/39; 385/115; 385/123; 385/126

(58) Field of Classification Search ............ 385/52, 385/115
See application file for complete search history.

(56) References Cited

U.S. PATENT DOCUMENTS

| | | | | |
|---|---|---|---|---|
| 5,093,879 A | * | 3/1992 | Bregman et al. | 385/93 |
| 5,557,693 A | * | 9/1996 | Stevens et al. | 385/24 |
| 6,398,425 B2 | * | 6/2002 | Williams et al. | 385/89 |
| 6,695,493 B2 | * | 2/2004 | Ciemiewcz | 385/89 |
| 6,763,157 B1 | * | 7/2004 | Williams et al. | 385/15 |
| 6,788,895 B2 | * | 9/2004 | Trezza | 398/9 |
| 7,118,285 B2 | * | 10/2006 | Fenwick et al. | 385/57 |
| 7,269,321 B2 | * | 9/2007 | Morris et al. | 385/115 |
| 7,379,641 B1 | * | 5/2008 | Johnson | 385/52 |
| 7,400,790 B2 | * | 7/2008 | Fenwick et al. | 385/14 |
| 7,460,752 B2 | * | 12/2008 | Johnson | 385/52 |

FOREIGN PATENT DOCUMENTS

JP         07-232149 A         3/1997

* cited by examiner

*Primary Examiner*—Frank G Font
*Assistant Examiner*—Ryan Lepisto
(74) *Attorney, Agent, or Firm*—The Law Firm of Andrea Hence Evans, LLC

(57) ABSTRACT

The present invention relates to a method of aligning circular multi-core fibers, wherein the method utilized independent and individually selected cores to receive, transmit, and emit light from input devices. The present invention further relates to positioning the ends of a multi-core fiber in order to detect and determine the precise locations of individually selected core fibers.

1 Claim, 3 Drawing Sheets

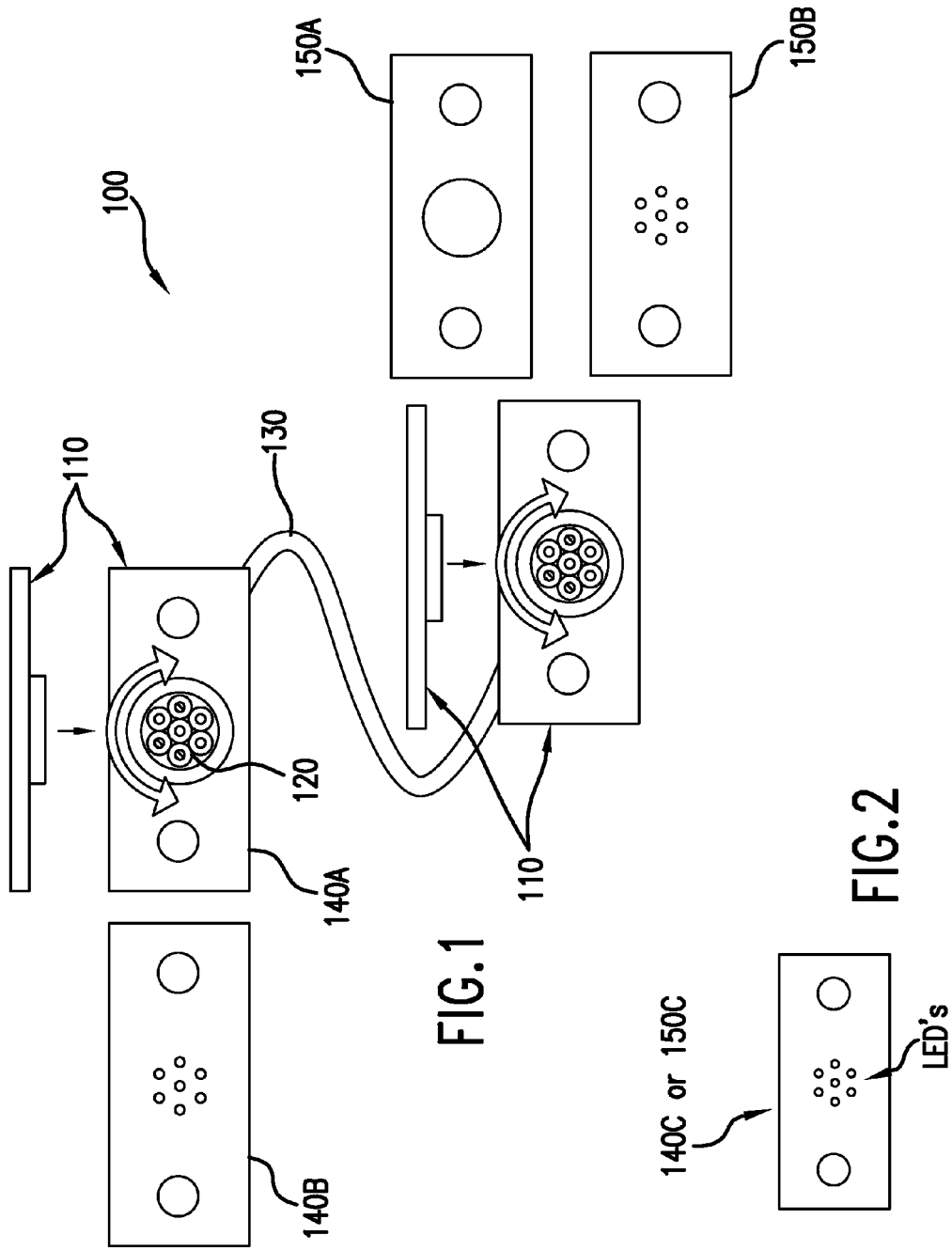

ALIGNMENT METHOD FOR CIRCULAR MULTI-CORE OPTICAL FIBER

CROSS REFERENCE TO RELATED APPLICATIONS

There are no cross-references to this application.

FIELD OF THE INVENTION

The present invention relates to a method and/or tool for multi-core optical fiber alignment and more particularly to a method and/or tool for using light input into specific individual cores, to achieve precise alignment of a multi-core optical fiber cable. Relevant potential applications for this invention include the fabrication of optical fiber cable, and communication transmissions utilizing optical fiber cables as interfaces for coupling devices.

BACKGROUND OF THE INVENTION

As the performance of computer systems has accelerated, optical high density transmission devices have been utilized to replace electronic devices. The use of optical devices for transmitting and receiving provides greater bandwidth and thus allows great amounts of data to be transferred.

Multi-core cable may utilize a continuous molding process. The use of the multi-core fiber optic cable has improved image transmission and reduced bending loss. Because many individual cores are utilized collectively, the cross-sectional shape of the multi-core cable is circular, similar to the normal shape of a single core fiber.

In order to apply such a circular optical multi-core cable to a high density transmission device, such as an optical multi-core connector and/or multi-channel transceiver or device, the alignment of a core level is essential. The complexity involved in identifying and precisely aligning the individual positions of each core of a circular multi-core fiber cable is difficult and not easily obtained.

SUMMARY OF THE INVENTION

The present invention provides a method of aligning a multi-core fiber cable, hereinafter multi-core fiber. In an aspect of an embodiment of the present invention, the method provides aligning a multi-core fiber, the multi-core fiber being composed of a plurality of individual core fibers having a first and second end.

In a further aspect of an embodiment of the present invention, the method comprises providing at least one light source to the first end of the multi-core fiber, wherein the at least one light source is applied to at least one of the plurality of individual core fibers. The at least one core fibers is independently identified and selected from the plurality of individual core fibers.

In a further aspect of an embodiment of the resent invention, the method provides detecting and determining an amount of light emitted and/or a light characteristic at the second end of the at least one core fiber.

In yet a further aspect of an embodiment of the present invention, the method provides adjusting a position of the second end of the multi-core fiber; wherein, the at least one core fiber is position to increases the amount of light and/or light characteristic to be detected at the second end of the multi-core fiber.

Additional aspects, objectives, and features of the present invention will become apparent from the following description of the preferred embodiments with reference to the attached drawings.

BRIEF DESCRIPTION OF THE DRAWINGS

FIG. 1 illustrates an exemplary arrangement used to align a circular multi-core fiber, in accordance with the embodiments of the present invention.

FIG. 2 illustrates an exemplary light emitting and receiving device, in accordance with the embodiments of the present invention.

DETAILED DESCRIPTION OF THE INVENTION

Figure 3:
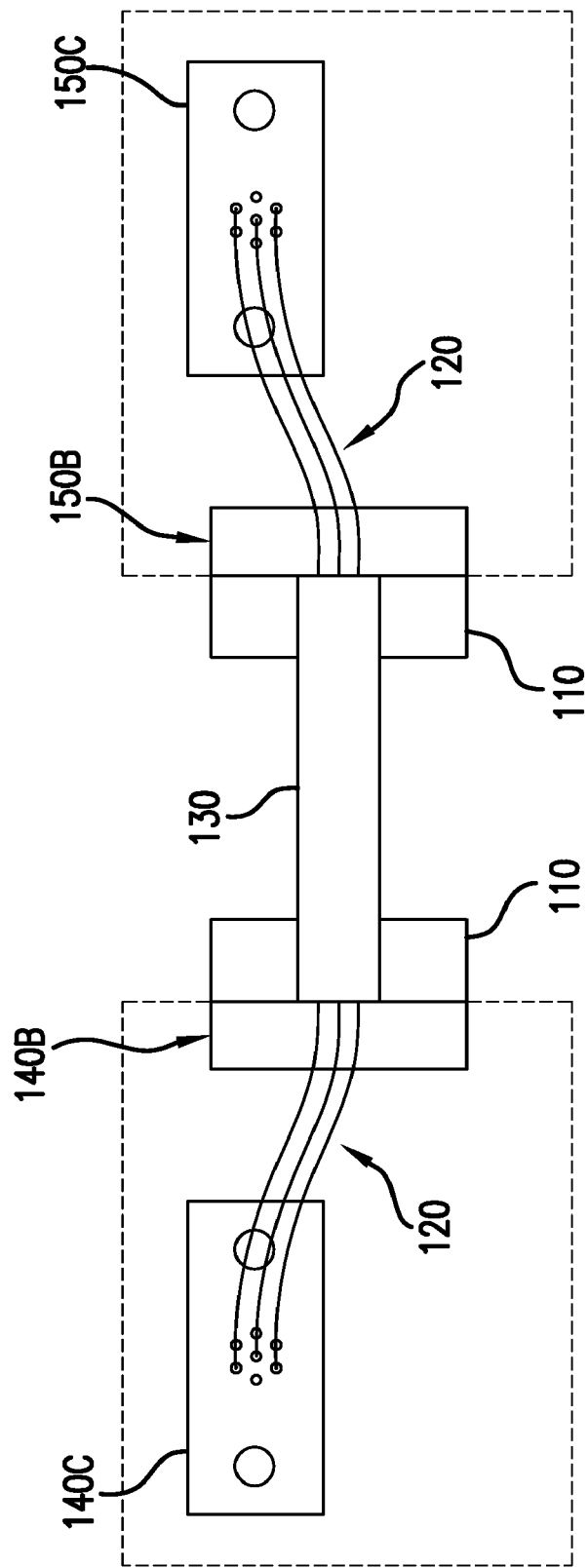
FIG. 3, illustrates an overview of the alignment arrangement for a circular multi-core fiber, in accordance with the embodiments of the present invention.
Figure 3A:
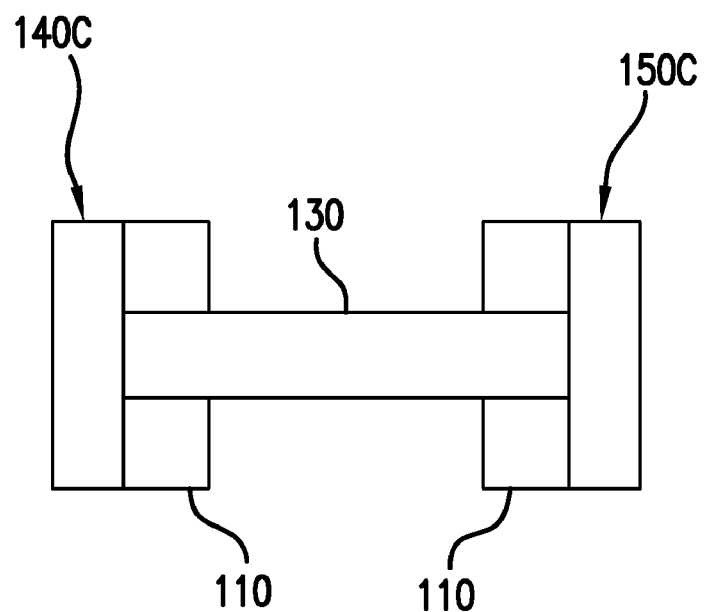
FIG. 3A, illustrates an alternative depiction of FIG. 3 including the light emitting/receiving device of FIG. 2 in accordance with an embodiment of the present invention.

As shown in FIG. 1, there may be two light types of light input and receiving alignment structures. The first type of alignment structure is shown in FIG. 1, and has been labeled as light input device 140A, the other has been depicted as device 140B. Light input device 140A allows the incident light from the input source to be aligned to first end of the multi-core fiber 120. In this step each core position is aligned to the incident light structure. Since, the light input receiving device 140A detects the whole amount of transmitted light the second end of the multi-core fiber 130 does not need to be aligned at this time. This makes it easier and more efficient to align the individual core input end to the light input device 140A.

The second type of alignment structure is shown in FIG. 1, and has been labeled as light receiving device 150B, similarly there is a corresponding light receiving structure depicted as device 150A. Light receiving device B, allows the incident light transmitted from the input source to be aligned to the second end of the multi-core fiber 130. More importantly with this type of alignment structure each core position is aligned to predetermined core positions that are fixed within the multi-core fiber. Stated differently, the light transmitted is restricted to positions where the same core positions are aligned on the light-input side of the multi-core fiber. Therefore, when using simultaneous and independent core positions within the multi-core fiber 130, there is one to one correspondence. That is, based upon the input and light characteristic (for e.g. amount of lights, wavelengths, intensities, frequencies etc.) utilized on the input side of the fiber a corresponding output of the core position may be readily obtained. The detection of incident light received at the second end of the multi-core fiber 130 may be evaluated and a determination made, as to whether the emitted light has obtained a predetermined threshold value, in accordance with the characteristics of the input light source. Adjustments to the multi-core fiber are made by moving either one or both of the ends of the multi-core holding devices. The movement may be lateral or rotational, and the movement may be controlled by servos, mechanical and/or electrical motors, joysticks, computer and/or programmed controlled devices (not shown). The determination may then be repeated until the desire threshold value is obtained. Accordingly, a precise alignment of the independently identified and selected core position may be determined.

In one aspect of an embodiment of the present invention, FIG. 1 depicts that the multi-core fiber 130 has been inserted in the holding devices 110. It further depicts that a light input device 140 having an alignment structure of type A 140A may be utilized at the input end of the multi-core fiber 130. The utilization of alignment structure type A, allows the aligning of the output end to occurred at a subsequent time. The light input device 140 or sources for this embodiment may be the same or different for each of the independently selected core fibers 120. For example, in an aspect of an embodiment of the present invention, three independent cores positions (asymmetrical) have been selected, and the input light devices or light sources are different for each of selected cores. By utilizing the alignment of light input device A and the movement (here rotating) of the holding device 110, the selected core fibers 120 can be aligned to input light only at the predetermined core positions. Thus, the individually selected core fibers are now positioned so that the maximum amount of light may be obtained at the output (second) end of multi-core fiber 130. The position of the input end of the multi core fiber may now be fixed, with respect to the holding device 110.

By utilizing the light receiving device 150B with the alignment structure of type B, at the receiving or second end of the multi-core fiber 130, light emitted may only be detected at a predetermined core position that is fixed. This fixed position corresponds to where the maximum amount of light may be received, as fixed by the corresponding core positions on the light input side. Therefore, by utilizing the alignment of the light receiving device and the movement or rotation of the holding device 110 at the output end, the alignment of the selected core fibers may be detected where the maximum amount of light is received. This position of the output end of the receiving device 150B may now be fixed. In an aspect of an embodiment of the present invention, since different light sources were utilized on the input-end, one can uniquely identify the one to one correspondence of the individually selected core fibers on the input side to that of the selected core fibers on the output side. For example, the position of maximum light may be based on the difference between the light power intensities or other light characteristics, such as identifying the maximum amount of light due to ND filtering, or frequency analysis, or the use of photo sensors/detectors, and/or photo-sensitive cameras, thus obtaining the precise alignment for the selected cores fibers.

FIG. 2, depicts another aspect of the embodiment of the invention, wherein a light emitting and receiving device on whose connection face of the core fiber to be aligned is mounted with a light source. This type of light emitting and receiving device may be utilized in the first aspects of the embodiment where the light emitting and receiving devices are comprised of LEDs. Thus, in a face directed at an optical core fiber to be aligned a light-input 140 C or light receiving device 150 C may be arranged at a predetermined location within the multi-core 130. Alternatively, light emitting and reception devices (respectively 140C or 150C) may be utilized to replace, augment, or supplement either one or both of the light emitting and/or reception devices (140A/B or 150A/B) describe in the aspect of the embodiments with respect to FIG. 1.

Regarding FIG. 3, another aspect of an embodiment of the present invention is to provide a method, tool and/or system for precisely aligning selected individual cores 120 within a multi-core fiber 130. The alignment tool or system 100 may include an optical fiber holding devices 110, as shown in FIG. 3. The holding devices 110 may be moveable or rotated to assist in the alignment of the individual core fibers 120. Each end of a multi-core fiber 130 that is to be aligned is inserted within the holding devices 110. The configuration, movement, and control of the holding devices are known in the art and may be accomplished via various art recognized methods and means.

Affixed to the holding devices 110 are light input devices 140 at a first end, and/or light receiving devices 150 at the second end, as shown in FIG. 3. The light input devices 140 may be for example a singular type of light source, such as a laser, LDs (laser diodes), LEDs (light emitting diodes) etc.; or a plurality of different types of light sources. The light sources may have the same or different light properties and/or characteristics, such as intensity, wavelengths, and/or blinking frequencies. The light input device 140 may have alignment functions such as pins for engaging with optical fiber connectors such as a MT ferrule for fixing the multi-core fiber within a holding means 110. The light input device 140 may also have a number of light incident structures for providing light selectively to predetermined individual cores 120. The selection of the individual cores 120 may be asymmetrical or any arbitrarily selected number of cores regardless of their location.

The light receiving 140 and/or detecting device 150 may be disposed at the second end of the multi-core fiber. The light receiving or detecting device corresponding to the type and characteristics of the light input device applied to the first end of the multi-core fiber. For example, the light receiving device 150 may be composed of photo sensors/detectors, cameras, phone diodes (PDs) having light focusing lens or other light transmission device as depicted in FIG. 3. These light detecting devices have an alignment structure similar to those utilized in the light input device 140, and the light receiving and detecting device 150 also has a number of alignment structures for receiving and/or detecting light from each individual core 120.

FIG. 3, depicts another embodiment of the multi-core alignment system, which utilizes the light emitting/input device 140C in conjunction with the light input structure of device type B. It further utilizes the light receiving structure of type B along with the light receiving device 150C. This arrangement may for example further utilize a light emitting source, for example such as the LEDs of FIG. 2. In a manner similar to that described in the embodiment with respect to FIG. 1, the light input device 140C is precisely aligned to that of the alignment structure device 140 B. The two are then fixed in position by the input holding means 110. Light receiving alignment structure 150 B and light receiving device 150C may then be then adjusted, so that, the maximum amount of light and/or light characteristic(s) may be detected on the independently identified and selected core fibers. The position of the light alignment structure 150B and that of light receiving device 150C may then be fixed, by the holding device 110. Accordingly, the precise position and location of the independently identified and selected core fiber(s) may be precisely ascertained, due to the one to one correspondence of the light and/or light input characteristic(s) on the input end of the multi-core as compare to that on the end of the multi-core fiber.

Another embodiment of the invention may include aspects to expedite the alignment process. For example, it is possible to accelerate alignment by optimally controlling such factors as the step and direction of course of motion and the rotation after receiving light at the second end. For example, a light receiving device may transmit a semicircular window corresponding to the upper half of the entire core. By making it possible to receive a large amount of light when adjusting the rotational position of the photo-excited cores (selected individual cores) of the multi-core fibers come to the same position in the upper half of the light receiving device 150. Thus, alignment can be easily performed due to the amount of continually varying light that is received. Although, the selection of the independently identified and selected core fibers has been described with regards to a semi-circle, any pattern or shape of core fiber(s) may be selected for the application of light at the input end of the multi-core. For example, one may select a line of independent core fibers, or those resembling a diamond, or square, or "X or C", or only those on the outer most surface of the core, or any patterns of core fiber (e.g. every other one etc.).

Figure 4:
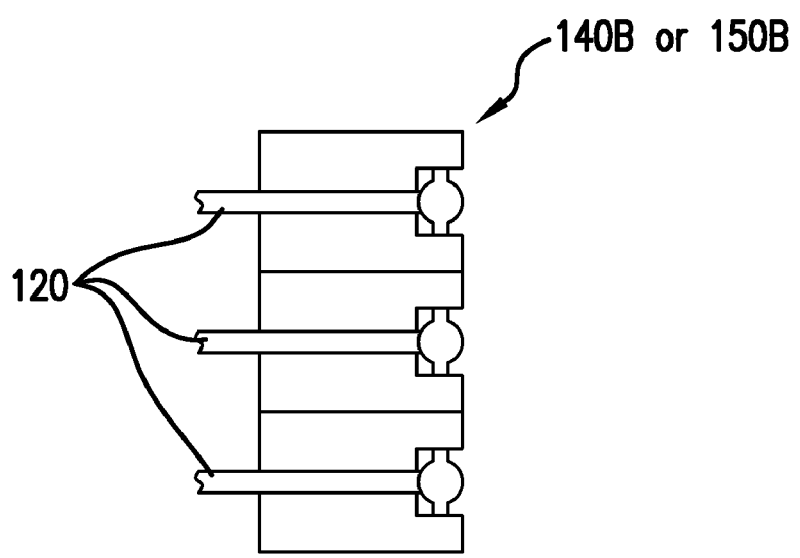
FIG. 4, illustrates a depiction of the profile view of the light emitting and receiving device of FIG. 2, being implemented as a light transmission or receiving device utilizing a plurality of lens, in accordance with the embodiments of the present invention.

FIG. 3 A, depicts an optical light device that is arranged in a face opposite the multi-core fiber that is to be aligned; on the other end of the multi-core fiber, is a light-emitting and receiving element is subject to alignment. This type of light emitting and receiving device may also be utilized in other aspects of the embodiment where the light emitting and receiving devices are comprised of LEDs. Furthermore, a minute lens may also be arranged at the face of an end directed at the optical fiber that is to be aligned as shown in FIG. 4. The lens may be of the type of ball or aspheric lens to help improve alignment accuracy. Accuracy may be improved due to the lens aiding in focusing and/or detecting the light emitted and received at the second end of the multi-core fiber.

In an alternative aspect of an embodiment of the present invention, the alignment may be performed by causing a single light source to enter into one or more cores in the multi-core fiber, where the cores are close to an outer circumference.

In an alternative aspect of an embodiment of the present invention, the alignment may be accomplished by causing a plurality of light and/or light intensities to enter into each of the one or more independently identified core fibers. The plurality of light sources and/or varied light intensities makes it possible to identify uniquely the positions and alignment of each of the one or more independently identified core fibers.

In yet, another alternative aspect of an embodiment of the present invention, the alignment may be accomplished by causing a plurality of light wavelengths and/or blinking frequencies to enter into each of the one or more independently identified core fibers. The plurality of light sources and/or varied light intensities makes it possible to identify uniquely the positions and alignment of each of the one or more independently identified core fibers.

The invention has been described in detail with particular reference to certain preferred embodiments thereof, but it will be understood that variations and modifications can be effected within the spirit and scope of the invention.

The invention claimed is:

1. A method of aligning a multi-core fiber, said multi-core fiber being composed of a plurality of individual core fibers having a first and second end, the method comprising:
    providing at least one light source to the first end of the multi-core fiber, wherein the at least one light source is applied to an independently identified and selected individual core fiber from the plurality of individual core fibers;
    detecting and determining an amount of light emitted and/or a light characteristic at the second end of the independently identified and selected individual core fiber; and
    adjusting a position of the second end of the multi-core fiber, wherein the independently identified and selected individual core fiber is positioned to increase the amount of light and/or light characteristic to be detected at the second end of the multi-core fiber.

* * * * *